Sept. 18, 1945.  L. H. MORIN  2,385,020
SEPARABLE FASTENER
Filed Sept. 10, 1943
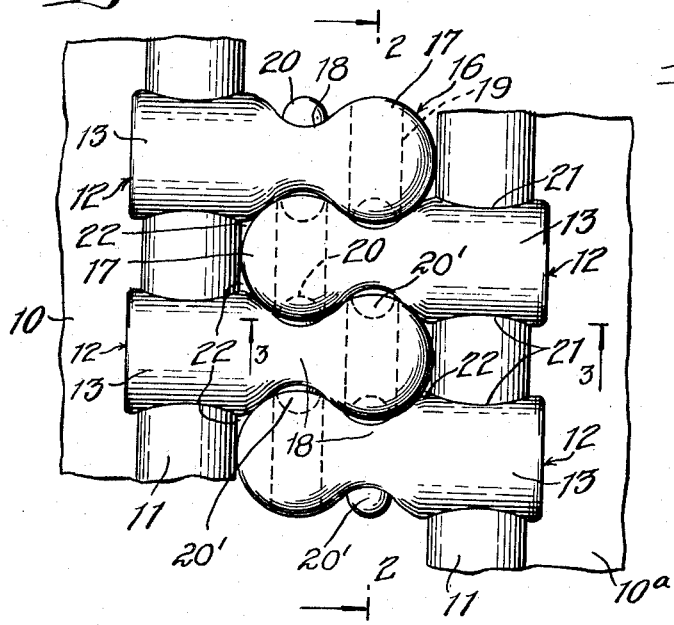
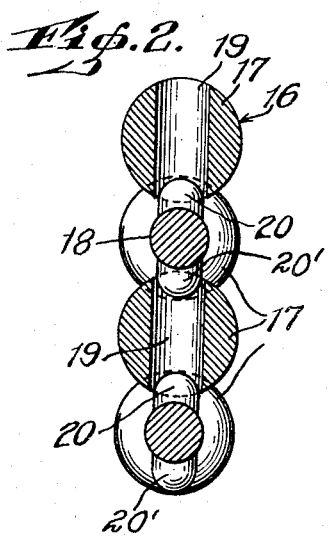
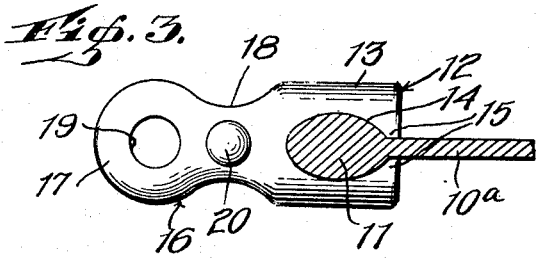
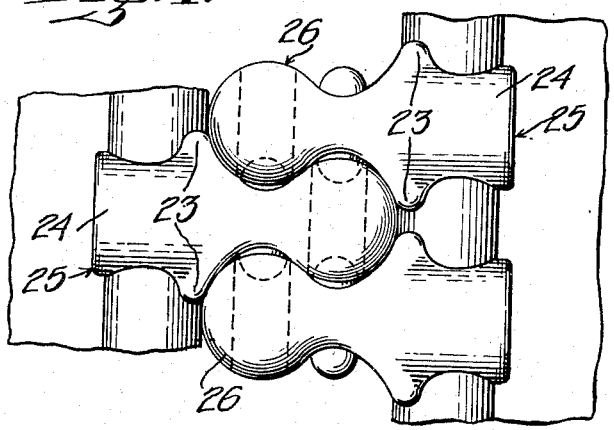
INVENTOR
LOUIS H. MORIN
BY
Gifford, Scull & Burgess
ATTORNEY Patented Sept. 18, 1945

2,385,020

UNITED STATES PATENT OFFICE 2,385,020

SEPARABLE FASTENER

Louis H. Morin, Bronx, N. Y., assignor of one-half to Davis Marinsky, Bronx, N. Y.

Application September 10, 1943, Serial No. 501,831

14 Claims. (Cl. 24—205)

This invention relates to separable fasteners of the type and kind employing stringers with sliders movable along the stringers to couple and uncouple the same. More particularly, the invention relates to a novel scoop construction wherein each scoop member comprises a ball like end joining a cylindrical mounting end in an annular neck on a curvature conforming with the periphery of the ball to produce between adjacent edges of opposed stringers a substantial seal, and further in providing greater flexibility of the stringers in bending or flexing the same.

The novel features of the invention will be best understood from the following description when taken together with the accompanying drawing, in which certain embodiments of the invention are disclosed, and in which the separate parts are designated by suitable reference characters in each of the views; and in which:

Fig. 1 is a plan view of a portion of two stringers, showing the coupling engagement between links or scoops thereof.

Fig. 2 is a section on the line 2—2 of Fig. 1.

Fig. 3 is a section on the line 3—3 of Fig. 1, but showing only one of the stringers with a link or scoop thereon; and Fig. 4 is a view similar to Fig. 1, showing only part of the construction, and showing a modification.

In the construction of stringers for separable fasteners of the kind under consideration, it has been the common practise to provide on the coupling end portions thereof, male and female couplings for engaging scoops of opposed stringers to couple the stringers together, and by virtue of the structure of the scoops and the male and female couplings, relatively large spaces were formed between adjacent and spaced edges of the stringers. Furthermore, the structure of the coupling end portions of the links or scoops also operate to check or limit flexure of the stringers one upon the other, particularly in sharp bending of the stringers. Still further, the flexure of the stringer tapes has been checked by virtue of the shape and form of the mounting end portions of the links or scoops arranged thereon.

It is the purpose of my invention to obviate these difficulties and objectionable features by providing links or scoops having cylindrical mounting ends and ball like coupling ends with reduced necks forming seats for the ball ends of the links of an opposed stringer, so that the resulting ball and socket construction provided between the coupled links or scoops will provide freer flexure of the scoops one upon the other, while at the same time, producing between adjacent edges of the scoops a more perfect seal between the fastener stringers. Furthermore, the formation of the mounting end portions of the scoops provides greater flexure of the stringers by dispensing with the corner portions of the conventional squared or rectangular mounting ends, and further in forming the concaved or recessed sides on the mounting end portions of the scoops by virtue of the cylindrical formation of the body engaging the beaded tape edges.

In Figs. 1 to 3 inclusive is shown one adaptation of the invention. In Fig. 1, portions of two stringers 10, 10—a are shown, and as these stringers are both of the same construction, the brief description of one stringer will apply to both. In this connection, it is pointed out that the links or scoops attached to the beaded edge 11 of the stringers, as indicated at 12, are of the double action type. In other words, these stringers are adapted for coupling regardless of the arrangement of the stringers with respect to each other, and further facilitating movement of sliders along the stringers in either direction for coupling and uncoupling the same. This general adaptability is herein referred to as universal coupling.

Each link or scoop comprises a substantially cylindrical mounting end portion 13, having a more or less elliptical passage 14 therethrough for the reception of the bead 11 of the stringer. The passage 14 opens through the end of the mounting portion 13, and forms resulting jaw like members 15 which engage the tape inwardly of the bead.

The coupling end portions 16 of the scoops terminate at their ends in male or ball like members 17, which join the mounting end portions 13 in reduced female or neck portions 18 of a curvature conforming to the curvature of the ball ends 17. This forms what may be termed a ball and socket coupling between the scoops of opposed stringers, as will clearly appear from a consideration of Fig. 1 of the drawing. It is preferred that the diameter of the ball end 17 be the same as the diameter of the cylindrical mounting end 13.

The ball end 17 has passages, apertures, sockets, or recesses 19 extending therethrough and parallel to the beaded edges 11 of the stringer tapes, or in other words, opening through upper and lower surfaces of the ball ends so as to receive projecting coupling pins 20 and 20', centrally of the recesses 18 on adjacent links or scoops of an opposed stringer.

The ball and socket construction formed by the male or ball part 17, and female portion or neck 18 of each scoop couples the stringers against lateral separation, whereas the passage 19 forms the female portion, and the pins 20 and 20' the male portion of a further coupling, which retains the scoops against transverse separation, as will be apparent. The pins 20 and 20' are also preferably rounded to facilitate the coupling of the scoops.

From a consideration of Fig. 3, it will be apparent that the opening of the passage 14 through opposite sides of the mounting end portions 13 of the scoops form concaved recesses 21 at each side of the scoops, and these recesses in addition to the cylindrical formation of the mounting ends 13, provide a greater flexure or bending of the tapes, particularly in the sharp bending of the coupled stringers.

Considering Fig. 1 of the drawing, it will appear that the construction of the coupling end portion 16 of the links or scoops is such as to provide substantial abutment of the outer extremities of the ball ends 17 with the beaded edges 11 of the tapes of opposed stringers when the stringers are coupled together. Thus a more or less complete closure or seal is formed between the coupled stringers aside from the slight passages indicated at 22, in Fig. 1 of the drawing. If these passages are objectionable, a more perfect seal may be effected by forming extensions or wings 23 on the mounting end portions 24 of links or scoops 25, shown in Fig. 4, which are otherwise of the same construction as the links or scoops 12, shown in Figs. 1 to 3 inclusive.

The scoops 25 include coupling end portions 26 which have the ball and socket primary couplings and the pin and socket supplemental couplings similar to the couplings 17, 18, 19, 20 and 20', in the structure shown in Fig. 1. The extension or wings 23 are provided to form closures for the small passages 22, appearing in Fig. 1, thus with a structure as shown in Fig. 4, a substantial seal is accomplished between the links or scoops aside from slight clearances which would be naturally allowed for coupling engagement. The further feature of the present structure resides in the fact that the seal or more or less complete closure between the links is maintained in the flexure or bending of the stringers to a materially greater degree than is accomplished with conventional types of link or scoop constructions.

In addition to the features of the link or scoop structure heretofore mentioned, it will also be apparent that from a standpoint of coupling or uncoupling the links or scoops by a slider movable along the stringers, a much smoother and freer coupling engagement is accomplished by virtue of the ball and socket structure of the scoops. All sharp and more or less pointed corners of the conventional scoop structures are dispensed with, and accordingly, the blocking action occasioned by these corners is removed. A conventional type of slider may be used to couple and uncouple scoops as shown and described herein, such as the slider of Patent 2,274,722.

Furthermore, the surface engagement of the links or scoops with the slider is also minimized, each link or scoop forming more or less of a roller bearing outer surface contour for engagement with opposed walls of the slider. This will readily appear from a consideration of Fig. 2 of the drawing, which shows the rounded surfaces exposed at the sides of the stringer links or scoops over which the walls of the slider pass.

Still further, one of the distinct advantages in the present scoop construction resides in the fact that a minimum amount of material is used in the construction of each scoop by dispensing with superfluous corner portions, commonly employed in the rectangular cross section of these devices. Thus materially reducing the cost of producing the resulting stringers.

It will be understood that the scoops may be constructed in any desired manner, and of any suitable materials and attached to the stringers in accordance with conventional and known practises. In forming the scoops as die castings, they will be formed directly upon the stringer tapes, and may be composed of cast metal or plastic materials. In considering the link or scoop structure, it may be said that a minimum amount of material is employed throughout the entire link or scoop, and this is done without in any way weakening the coupling engagement between the stringers. To the contrary, the reduction of friction in engagement of the links or scoops and in operation of the slider thereon will materially increase the useful life of the fastener.

Engagement between coupled scoops forms more or less of a line contact, rather than a wide surface contact and this is due to the curvatures of the ball and socket portions of the coupling ends. One distinctive advantage of this construction is the ability to free the fastener of foreign matter, which might collect thereon, particularly when such fasteners are arranged upon overshoes or other footwear and may be exposed to mud and dirt in the use thereof. Furthermore, the free flexing or rocking of the scoops, one upon the other, is also desirable in conforming to the irregular contour of apparel of this and other types and kinds. It will also be apparent from a consideration of Fig. 4 of the drawing that the extended wings 23 form almost a complete circumferential socket between adjacent scoops for the reception of the ball ends. In considering the arrangement of the scoops on each stringer, the structure might further be described in saying that the spacing between opposed surfaces of the ball ends of adjacent scoops is substantially the same as the diameter of the neck or socket portion of each scoop. On the other hand, the spacing between the neck or socket portions of adjacent scoops is substantially common with the diameter of the ball end of a scoop.

Having fully described my invention, what I claim as new and desire to secure by Letters Patent is:

1. In separable fasteners employing stringers, said stringers having scoops spaced longitudinally of edge portions of the tapes thereof, each scoop comprising a mounting end portion of substantially cylindrical cross-sectional form, the coupling end portion of the scoop comprising a ball-like end forming the male portion of said coupling end, an annular recess inwardly of said ball forming the female portion or neck of said coupling end, the curvature of the neck corresponding to the contour of the ball to form a substantial line contact between scoops of opposed stringers when said stringers are coupled together, the ball end of each scoop having an aperture, and the neck having on opposed walls projecting members adapted to enter the apertures in the ball end of scoops of an opposed stringer.

2. In separable fasteners employing stringers, said stringers having scoops spaced longitudinally of edge portions of the tapes thereof, each scoop comprising a mounting end portion of substantially cylindrical cross-sectional form, the coupling end portion of the scoop comprising a ball-like end forming the male portion of said coupling end, an annular recess inwardly of said ball forming the female portion or neck of said coupling end, the curvature of the neck corresponding to the contour of the ball to form a substantial line contact between scoops of opposed stringers when said stringers are coupled together, the ball end of each scoop having an aperture, the neck having on opposed walls projecting members adapted to enter the apertures in the ball end of scoops of an opposed stringer, said projecting members having rounded ends, and the diameter of the ball end corresponding to the diameter of the cylindrical mounting end of the scoop, and the ends of said members being arranged within the circumferential boundaries of said ball and mounting ends.

3. In separable fasteners employing stringers, comprising tapes having beaded edges, scoops spaced along and projecting from the beaded edges of the stringer tape, each scoop comprising a substantially cylindrical mounting end arranged upon the beaded edge of the tape and presenting on opposed surfaces of the tape cylindrical-like bearing surfaces, each scoop having a coupling portion projecting beyond the beaded edge of the tape, the coupling portion comprising an annular recess or neck, outwardly of which is a substantially ball end adapted to seat snugly in the neck of scoops of an opposed stringer in coupling the stringers together, other means on the coupling portions of the scoops for retaining coupled scoops against transverse separation, and said ball ends of the scoops presenting rounded bearing surfaces substantially corresponding to the cross-sectional contour of the bearing surfaces of the mounting end portions of said scoops.

4. In separable fasteners employing stringers, comprising tapes having beaded edges, scoops spaced along and projecting from the beaded edges of the stringer tape, each scoop comprising a substantially cylindrical mounting end arranged upon the beaded edge of the tape and presenting on opposed surfaces of the tape cylindrical-like bearing surfaces, each scoop having a coupling portion projecting beyond the beaded edge of the tape, the coupling portion comprising an annular recess or neck, outwarly of which is a substantially ball end adapted to seat snugly in the neck of scoops of an opposed stringer in coupling the stringers together, other means on the coupling portions of the scoops for retaining coupled scoops against trasverse separation, said ball ends of the scoops presenting rounded bearing surfaces substantially corresponding to the cross-sectional contour of the bearing surfaces of the mounting end portions of said scoops, the curvature of the recessed portion of the scoops extending to the outer edges of the bead of the tapes, and outer surfaces of the ball ends being arranged adjacent said beaded edges of the tapes of opposed stringers to substantially close the opening between spaced beaded edges of the tapes, when said stringers are coupled together.

5. In separable fasteners employing stringers, comprising tapes having beaded edges, scoops spaced along and projecting from the beaded edges of the stringer tape, each scoop comprising a substantially cylindrical mounting end arranged upon the beaded edge of the tape and presenting on opposed surfaces of the tape clylindrical-like bearing surfaces, each scoop having a coupling portion projecting beyond the beaded edge of the tape, the coupling portion comprising an annular recess or neck, outwardly of which is a substantially ball end adapted to seat snugly in the neck of scoops of an opposed stringer in coupling the stringers together, other means on the coupling portions of the scoops for retaining coupled scoops against transverse separation, said ball ends of the scoops presenting rounded bearing surfaces substantially corresponding to the cross-sectional contour of the bearing surfaces of the mounting end portions of the scoops, the curvature of the recessed portion of the scoops extending to the outer edges of the bead of the tapes, outer surfaces of the ball ends being arranged adjacent said beaded edges of the tapes of opposed stringers to substantially close the opening between spaced beaded edges of the tapes, when said stringers are coupled together, and each scoop having intermediate the mounting and coupling ends laterally extending wing portions forming additional seals and closures between coupled scoops.

6. In separable fastener stringers, having scoops spaced longitudinally of one edge of the tape of the stringers, each scoop having a yoke-shaped mounting end portion, said mounting end portion having outer curved surfaces extending substantially the full length thereof producing a substantially cylindrical form throughout said end portion, the other coupling end portion of the scoop having an outer ball end, inwardly of which is an annular socket portion, the curvature of the ball end conforming with the curvature of the socket portion providing between coupled scoops of opposed stringers a substantial closure, said ball and socket coupling portions in conjunction with the cylindrical mounting portions providing maximum bending or folding of the stringers one upon the other, and interengaging means on coupling end portions of the scoops for retaining said scoops against transverse separation.

7. In separable fastener stringers, having scoops spaced longitudinally of one edge of the tape of the stringers, each scoop having a yoke-shaped mounting end portion, said mounting end portion having outer curved surfaces extending substantially the full length thereof producing a substantially cylindrical form throughout said end portion, the other coupling end portion of the scoop having an outer ball end, inwardly of which is an annular socket portion, the curvature of the ball end conforming with the curvature of the socket portion providing between coupled scoops of opposed stringers a substantial closure, said ball and socket coupling portions in conjunction with the cylindrical mounting portions providing maximum bending or folding of the stringers one upon the other, interengaging means on coupling end portions of the scoops for retaining said scoops against transverse separation, said last named means comprising recesses in the ball ends, and projecting members in the sockets adapted to enter the recesses in the ball ends of scoops of an opposed stringer.

8. In separable fastener stringers, having scoops spaced longitudinally of one edge of the tape of the stringers, each scoop having a yoke-shaped mounting end portion, said mounting end portion having outer curved surfaces extending substantially the full length thereof producing a substantially cylindrical form throughout said end portion, the other coupling end portion of the scoop having an outer ball end, inwardly of which is an annular socket portion, the curvature of the ball end conforming with the curvature of the socket portion providing between coupled scoops of opposed stringers a substantial closure, said ball and socket coupling portions in conjunction with the cylindrical mounting portions providing maximum bending or folding of the stringers one upon the other, interengaging means on coupling end portions of the scoops for retaining said scoops against transverse separation, said last named means comprising recesses in the ball ends, projecting members in the sockets adapted to enter the recesses in the ball ends of scoops of an opposed stringer, and each scoop intermediate the mounting and coupling end portions having laterally extending wings.

9. In separable fastener stringers, having scoops spaced longitudinally of one edge of the tape of the stringers, each scoop having a yoke-shaped mounting end portion, said mounting end portion having outer curved surfaces extending substantially the full length thereof producing a substantially cylindrical form throughout said end portion, the other coupling end portion of the scoop having an outer ball end, inwardly of which is an annular socket portion, the curvature of the ball end conforming with the curvature of the socket portion providing between coupled scoops of opposed stringers a substantial closure, said ball and socket coupling portions in conjunction with the cylindrical mounting portions providing maximum bending or folding of the stringers one upon the other, interengaging means on coupling end portions of the scoops for retaining said scoops against transverse separation, said last named means comprising recesses in the ball ends, projecting members in the sockets adapted to enter the recesses in the ball ends of scoops of an opposed stringer, each scoop intermediate the mounting and coupling end portions having laterally extending wings, and the wings of adjacent scoops in conjunction with the socket portions thereof forming sockets conforming to the contour of the ball end of the scoops and forming a substantial seal between adjacent coupled scoops.

10. In separable fasteners of the class described, a pair of stringers, each stringer comprising a tape with scoops spaced longitudinally of one edge portion of the tape, the scoops of each stringer having coupling portions projecting beyond the tape edges, the coupling portions of all scoops being common to provide universal coupling and uncoupling of the stringers, each scoop having on opposed surfaces convex and concaved contours forming male and female coupling portions of the scoops, the convex surfaces of the scoops of one stringer seating in the concaved surfaces of scoops of the opposed stringer in coupling the stringers together, said engaging surfaces providing free rocking movement of the scoops one upon the other in free flexure of the stringers, means retaining coupled scoops against transverse separation, and means on the concave contours of the scoops cooperating with the convex surfaces thereof to form a substantial seal between coupled scoops.

11. In separable fasteners of the class described, a pair of stringers, each stringer comprising a tape with scoops spaced longitudinally of one edge portion of the tape, the scoops of each stringer having coupling portions projecting beyond the tape edges, the coupling portions of all scoops being common to provide universal coupling and uncoupling of the stringers, the coupling portion of each scoop having a head and a neck forming male and female coupling portions of the scoop, the cross section of the head and neck being substantially circular, the heads of the scoops on one stringer seating in the necks of scoops in opposed stringers in coupling the stringers together, the heads and necks of coupled scoops having line contacting engagement providing free rocking movement of the scoops one upon the other in free flexure of the stringers, and means on said heads and necks retaining coupled scoops against transverse separation.

12. In separable fasteners employing stringers having scoops spaced longitudinally of one edge portion thereof, said scoops having projecting coupling portions, means on said coupling portions for coupling the scoops against lateral and transverse separation when scoops of opposed stringers are coupled together, said scoops having mounting end portions arranged upon the stringers, and said mounting end portions and the coupling end portions of each scoop being substantially circular in cross sectional form throughout the major part of the length thereof, presenting at opposite surfaces of coupled stringers rounded bearing surfaces throughout the full length of the stringers when in straight or curved positions.

13. A scoop for separable fastener stringers, comprising a substantially cylindrical mounting end, a ball like member at the other end of the scoop of a diameter substantially common to the diameter of the mounting end, said ends being joined by an annular neck portion, said neck portion having a curvature conforming to the curvature of the ball end, said ends and said neck portion being all substantially circular in cross section, and means on opposed sides of the ball end and neck portion of the scoop forming common male and female couplings.

14. A scoop for separable fastener stringers, comprising a substantially cylindrical mounting end, a ball like member at the other end of the scoop of a diameter substantially common to the diameter of the mounting end, said ends being joined by an annular neck portion, said neck portion having a curvature conforming to the curvature of the ball end, said ends and said neck portion being all substantially circular in cross section, means on opposed sides of the ball end and neck portion of the scoop forming common male and female couplings, said last named means comprising projecting pin members on said neck portion, and sockets on the ball end adapted to receive pin members of scoops of an opposed stringer in coupling stringers together.

LOUIS H. MORIN.